United States Patent [19]
Lee et al.

[11] Patent Number: 5,946,043
[45] Date of Patent: Aug. 31, 1999

[54] VIDEO CODING USING ADAPTIVE CODING OF BLOCK PARAMETERS FOR CODED/ UNCODED BLOCKS

[75] Inventors: Ming-Chieh Lee, Bellevue; Wei-ge Chen, Seattle, both of Wash.

[73] Assignee: Microsoft Corporation, Redmond, Wash.

[21] Appl. No.: 09/001,573

[22] Filed: Dec. 31, 1997

[51] Int. Cl.$^6$ ...................................................... H04N 7/50
[52] U.S. Cl. ........................................... 348/420; 348/415
[58] Field of Search ..................................... 348/420, 401, 348/403–404, 409, 415; 382/236, 238, 243; 386/109, 111; H04N 7/50

[56] References Cited

U.S. PATENT DOCUMENTS

| | | | |
|---|---|---|---|
| 5,351,086 | 9/1994 | Park .......................................... | 348/402 |
| 5,448,297 | 9/1995 | Alattar et al. ............................ | 348/415 |
| 5,465,118 | 11/1995 | Hancock et al. ......................... | 348/420 |
| 5,870,148 | 2/1999 | Lillevold .................................. | 348/415 |
| 5,880,784 | 3/1999 | Lillevold .................................. | 348/404 |

OTHER PUBLICATIONS

"Video Coding for Low Bitrate Communication," Draft Recommendation H.263, International Telecommunication Union, Dec. 1995, 51 pages.

*Primary Examiner*—Vu Le
*Attorney, Agent, or Firm*—Klarquist Sparkman Campbell Leigh & Whinston, LLP

[57] ABSTRACT

Video coding efficiency for high motion scenes is improved by adaptively disabling a parameter indicating whether texture and motion data is coded for a macroblock. The COD parameter is disabled when the number of macroblocks with substantially all zero motion and texture data is less than a threshold number. This reduces the number of bits required to code an interframe video image in a video sequence with high motion and large changes from frame to frame. The coded block pattern for chrominance is also used to determine how to perform entropy coding for the coded block pattern for luminance. In interframe blocks, if the chrominance blocks are coded, it is likely that the luminance blocks will be coded as well. The coded block pattern for chrominance, therefore, is used to select the appropriate entropy coding table for the coded block pattern for luminance.

20 Claims, 4 Drawing Sheets

VIDEO CODING USING ADAPTIVE CODING OF BLOCK PARAMETERS FOR CODED/UNCODED BLOCKS

FIELD OF THE INVENTION

The invention relates to video coding, and specifically, to an improved video coding method used in video coders and decoders.

BACKGROUND OF THE INVENTION

Full-motion video displays based upon analog video signals have long been available in the form of television. With recent advances in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video displays include large numbers of image frames that are played or rendered successively at frequencies of between 30 and 75 Hz. Each image frame is a still image formed from an array of pixels based on the display resolution of a particular system. As examples, VHS-based systems have display resolutions of 320×480 pixels, NTSC-based systems have display resolutions of 720×486 pixels, and high-definition television (HDTV) systems under development have display resolutions of 1360×1024 pixels.

The amounts of raw digital information included in video sequences are massive. Storage and transmission of these amounts of video information is infeasible with conventional personal computer equipment. Consider, for example, a digitized form of a relatively low resolution VHS image format having a 320×480 pixel resolution. A full-length motion picture of two hours in duration at this resolution corresponds to 100 gigabytes of digital video information. By comparison, conventional compact optical disks have capacities of about 0.6 gigabytes, magnetic hard disks have capacities of 1–2 gigabytes, and compact optical disks under development have capacities of up to 8 gigabytes.

To address the limitations in storing or transmitting such massive amounts of digital video information, various video compression standards or processes have been established, including MPEG-1, MPEG-2, and H.26X. These video compression techniques utilize similarities between successive image frames, referred to as temporal or interframe correlation, to provide interframe compression in which motion data and error signals are used to encode changes between frames.

In addition, the conventional video compression techniques utilize similarities within image frames, referred to as spatial or intraframe correlation, to provide intraframe compression in which the image samples within an image frame are compressed. Intraframe compression is based upon conventional processes for compressing still images, such as discrete cosine transform (DCT) encoding. This type of coding is sometimes referred to as "texture" or "transform" coding. A "texture" generally refers to a two-dimensional array of image sample values, such as an array of chrominance and luminance values or an array of alpha (opacity) values. The term "transform" in this context refers to how the image samples are transformed into spatial frequency components during the coding process. This use of the term "transform" should be distinguished from a geometric transform used to estimate scene changes in some interframe compression methods.

Interframe compression typically utilizes motion estimation and compensation to encode scene changes between frames. Motion estimation is a process for estimating the motion of image samples (e.g., pixels) between frames. Using motion estimation, the encoder attempts to match blocks of pixels in one frame with corresponding pixels in another frame. After the most similar block is found in a given search area, the change in position of the pixel locations of the corresponding pixels is approximated and represented as motion data, such as a motion vector. Motion compensation is a process for determining a predicted image and computing the error between the predicted image and the original image. Using motion compensation, the encoder applies the motion data to an image and computes a predicted image. The difference between the predicted image and the input image is called the error signal. Since the error signal is just an array of values representing the difference between image sample values, it can be compressed using the same texture coding method as used for intraframe coding of image samples.

Although differing in specific implementations, the MPEG-1, MPEG-2, and H.26X video compression standards are similar in a number of respects. The following description of the MPEG-2 video compression standard is generally applicable to the others.

MPEG-2 provides interframe compression and intraframe compression based upon square blocks or arrays of pixels in video images. A video image is divided into image sample blocks called macroblocks having dimensions of 16×16 pixels. In MPEG-2, a macroblock comprises four luminance blocks (each block is 8×8 samples of luminance (Y)) and two chrominance blocks (one 8×8 sample block each for Cb and Cr).

In MPEG-2, interframe coding is performed on macroblocks. An MPEG-2 encoder performs motion estimation and compensation to compute motion vectors and block error signals. For each block $M_N$ in an image frame N, a search is performed across the image of a next successive video frame N+1 or immediately preceding image frame N−1 (i.e., bi-directionally) to identify the most similar respective blocks $M_{N+1}$ or $M_{N-1}$. The location of the most similar block relative to the block $M_N$ is encoded with a motion vector (DX,DY). The motion vector is then used to compute a block of predicted sample values. These predicted sample values are compared with block $M_N$ to determine the block error signal. The error signal is compressed using a texture coding method such as discrete cosine transform (DCT) encoding.

Object based video coding techniques have been proposed as an improvement to the conventional frame based coding standards. In object based coding, arbitrary shaped image features are separated from the frames in the video sequence using a method called "segmentation." The video objects or "segments" are coded independently. Object based coding can improve the compression rate because it increases the interframe correlation between video objects in successive frames. It is also advantageous for variety of applications that require access to and tracking of objects in a video sequence.

In the object based video coding methods proposed for the MPEG-4 standard, the shape, motion and texture of video objects are coded independently. The shape of an object is represented by a binary or alpha mask that defines the boundary of the arbitrary shaped object in a video frame. The motion of an object is similar to the motion data of MPEG-2, except that it applies to an arbitrary-shaped image of the object that has been segmented from a rectangular frame. Motion estimation and compensation is performed on blocks of a "video object plane" rather than the entire frame. The video object plane is the name for the shaped image of an object in a single frame.

The texture of a video object is the image sample information in a video object plane that falls within the object's shape. Texture coding of an object's image samples and error signals is performed using similar texture coding methods as in frame based coding. For example, a segmented image can be fitted into a bounding rectangle formed of macroblocks. The rectangular image formed by the bounding rectangle can be compressed just like a rectangular frame, except that transparent macroblocks need not be coded. Partially transparent blocks are coded after filling in the portions of the block that fall outside the object's shape boundary with sample values in a technique called "padding."

Frame based coding techniques such as MPEG-2 and H26X and object based coding techniques proposed for MPEG-4 are similar in that they perform intraframe and interframe coding on macroblocks. The interframe coding format for these techniques uses a special bit to indicate whether the interframe macroblock is coded. This special bit is sometimes called the COD bit or the "not coded" bit. To be consistent, we refer to this type of parameter as a COD bit or COD parameter. The COD bit indicates whether or not the encoded macroblock includes motion data and texture coded error data. In cases where the motion and error signal data is zero, the COD bit reduces the information needed to code the macroblock because only a single bit is sent rather than additional bits indicating that the motion vector and texture data is not coded.

In addition to the COD bit, the coding syntax for macroblocks includes coded block parameters (CBP) indicating whether the coded transform coefficients for chrominance and luminance are transmitted for the macroblock. If the transform coefficients are all zero for a block, then there is no need to send texture data for the block. The Coded Block Parameters for chrominance (CBPC) are two bits indicating whether or not coded texture data is transmitted for each of the two chrominance blocks. The Coded Block Pattern for luminance (CBPY) are four bits indicating whether or not coded texture data is transmitted for each of the four luminance blocks.

The CBPC bits are encoded along with another flag that provides information about the type of quantization for the macroblock. These flags are combined to form a parameter called MCBPC, and MCBPC is entropy coded using an entropy coding method such as Huffman or arithmetic coding. The CBPY flags are also entropy coded using either Huffman or arithmetic coding.

While the COD bit has advantages in the coding of scenes with very little motion, it is inefficient for scenes that change frequently and have very few macro blocks with zero motion vectors (i.e. motion vectors indicating zero motion). Thus, there is a need for a more efficient application of the COD bit for these types of scenes.

The variable length code for CBPY is based on the assumption that intraframe macroblocks include more coded luminance blocks than non-coded blocks, while for inter macroblocks, the opposite is true. This assumption is violated in some cases, and thus, leads to inefficient coding of the CBPY flags.

SUMMARY OF THE INVENTION

The invention provides an improved method of coding block parameters for video sequences that are coded using motion estimation and compensation. One aspect of the invention is a method for adaptively coding a COD parameter that indicates whether texture and motion data is coded for interframe macroblocks. Another aspect of the invention is a method for adaptively selecting an entropy coding mode for the coded block parameters for luminance based on the coded block parameters for chrominance. Both of these features apply to object-based and frame-based video coding.

Adaptive coding of the COD parameter improves coding efficiency for a number of video coding applications, and in particular, for scenes with few macroblocks with zero motion. Adaptive coding of the COD parameter refers to a method for selectively disabling COD parameter based on the number of non-coded macroblocks in a video image. Adaptive coding of the COD parameter is implemented in the encoder by determining the number of macroblocks in an image with zero texture and motion ("skipped macroblocks). The COD parameter is then disabled for interframe macroblocks in the image when the number of skipped macroblocks is less than a threshold value.

The threshold number is derived from the total number of macroblocks in the image and the number of bits needed to encode motion and texture in an interframe macroblock in which the motion and texture data is all zero. At the threshold point, it takes fewer bits to code all macroblocks without the COD parameter because there are more COD bits than the number of bits needed to code motion and texture data for the interframe blocks for which the texture and motion data is zero. For example, if it requires five bits to encode zero motion and texture for a macroblock, then the threshold number is one-fifth the total number of macroblocks for the image.

The adaptive disabling of the COD parameter is represented using a COD disable flag that is provided with each interframe image. This flag indicates whether the COD parameter is included with each macroblock in the image. The encoder determines the value of this flag after performing motion estimation, motion compensation, and texture coding for the image because these processes indicate how many blocks have macroblocks with zero texture and motion data. The decoder uses the COD disable flag to determine whether to decode the COD parameter for each macroblock.

Coding efficiency can be improved further by adaptively selecting the entropy coding mode for the coded block pattern for luminance (CBPY) based on the coded block pattern for chrominance (CBPC). This improved coding method selects the entropy coding for CBPY in interframe macroblocks based on whether the CBPC bits are set for the macroblock. When the CBPC bits are set ("11") in an interframe macroblock, the luminance blocks are more likely to have non-zero transform coefficients. As such, entropy coding is selected so that fewer bits are used to encode CBPY for coded luminance blocks. Conversely, when one of the CBPC bits is not set, entropy coding is selected so that fewer bits are used to encode CBPY for non-coded luminance blocks.

The methods summarized above improve coding efficiency for interframe macroblocks in video scenes with few macroblocks having zero motion and frequent changes from frame to frame. Adaptive disabling of the COD parameter can save up to 2–3% of the total bit rate for low bit rate applications. Adaptive selection of the CBPY coding mode for interframe blocks has been demonstrated to reduce the number of bits needed to encode CBPY by over 25%. These methods improve coding efficiency without increasing the complexity of encoder and decoder design or creating compatibility problems.

Additional features and advantages of the invention will become more apparent from the following detailed description and accompany drawings of an implementation of the invention.

DETAILED DESCRIPTION

Introduction

The first section below provides a description of a video encoder and decoder. Subsequent sections describe how to improve coding by: 1) adaptively enabling a block parameter indicating whether motion and texture is coded for a block, and 2) improving the entropy coding of block parameters indicating whether luminance blocks are coded for a macroblock.

The invention applies to both frame-based and object-based video coding. The invention improves the coding of a sequence of images, whether the images represent video objects planes derived from a sequence of frames or the entire frames. Object based coding includes similar motion and texture coding components used in frame based coding as well as shape coding. The block syntax relevant to the invention is similar in both frame based and object based coding. Thus, while the encoder and decoder described in the next section are object based, they provide a sufficient basis for explaining how to implement the invention in both frame based and object based coding schemes.

Description of an Example Encoder and Decoder

Figure 1:
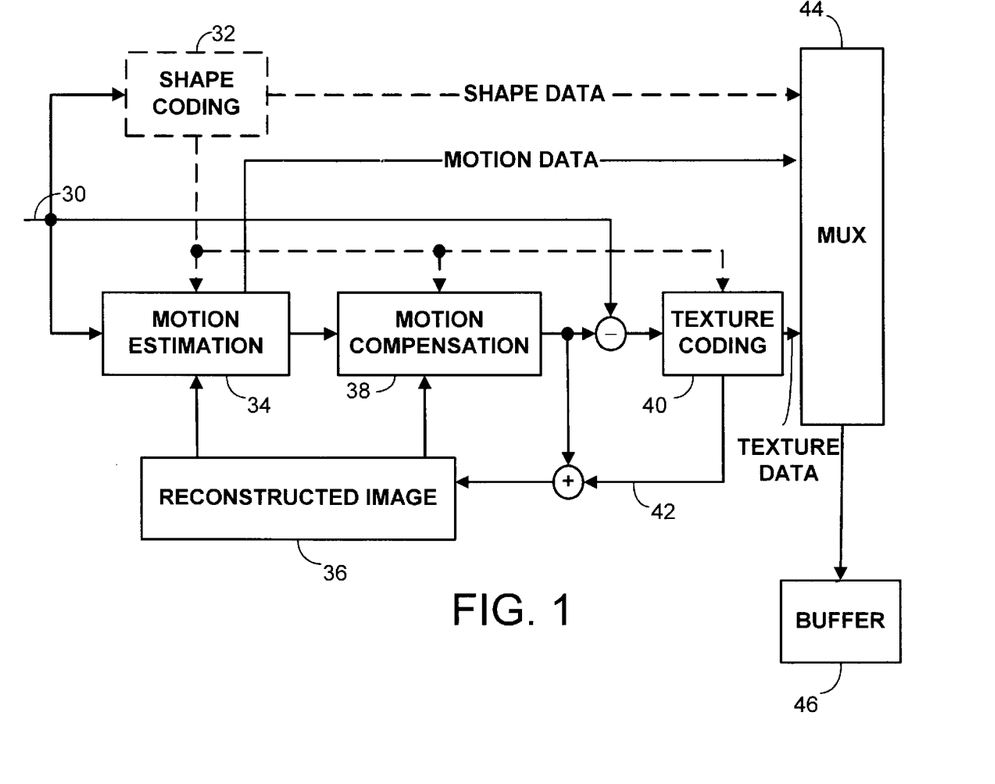
FIG. 1 is a block diagram of a video coder.

FIG. 1 is a block diagram illustrating an implementation of an object-based video encoder. The input 30 to the encoder includes a series of objects, their shape information and bounding rectangles. The shape information, therefore, is available before the encoder codes texture or motion data. Frame based coding differs in that the entire frame is coded without shape information.

The shape coding module 32 receives the definition of an object including its bounding rectangle and extends the bounding rectangle to integer multiples of macroblocks. The shape information for an object comprises a mask or "alpha plane." The shape coding module 32 reads this mask and compresses it, using for example, a conventional chain coding method to encode the contour of the object.

Motion estimation module 34 reads an object including its bounding rectangle and a previously reconstructed image 1636 and computes motion estimation data used to predict the motion of an object from one frame to another. The motion estimation module 1634 searches for the most similar macroblock in the reconstructed image for each macroblock in the current image to compute the motion data for each macroblock. The specific format of the motion data from the motion estimation module 1634 can vary depending on the motion estimation method used. For example, the motion data can include motion vectors or geometric transform coefficients such as affine transform coefficients used to predict motion of the macroblock. In standard motion coding, the motion data includes one motion vector for each macroblock, or four motion vectors corresponding to the four luminance blocks in the macroblock.

The motion compensation module 38 reads the motion data computed by the motion estimation module and the previously reconstructed image 36 and computes a predicted image for the current frame. The encoder finds the difference between the image sample values in the input image block as specified in the input 30 and the corresponding sample values in the predicted image block as computed in the motion compensation module 38 to determine the error signal for the macroblock.

Texture coding module 40 compresses this error signal for inter-frame coded objects and compresses image sample values for the object from the input data stream 30 for intra-frame coded objects. The feedback path 42 from the texture coding module 40 represents the error signal. The encoder uses the error signal blocks along with the predicted image blocks from the motion compensation module to compute the previously reconstructed image 36.

The texture coding module 40 codes intra-frame and error signal data for an object using any of a variety of still image compression techniques. Example compression techniques include DCT, wavelet, as well as other conventional image compression methods.

The bitstream of the compressed video sequence includes the shape, motion and texture coded information from the shape coding, motion estimation, and texture coding modules. Multiplexer 44 combines and formats this data into the proper syntax and outputs it to the buffer 46.

While the encoder can be implemented in hardware or software, it is most likely implemented in software. In a software implementation, the modules in the encoder represent software routines executing in memory of a computer and memory used to store the video data. A software encoder can be stored and distributed on a variety of conventional computer readable media. In hardware implementations, the encoder modules are implemented in digital logic, preferably in an integrated circuit. Some of the encoder functions can be optimized in special purpose digital logic devices in a computer peripheral to off-load the processing burden from a host computer.

Figure 2:
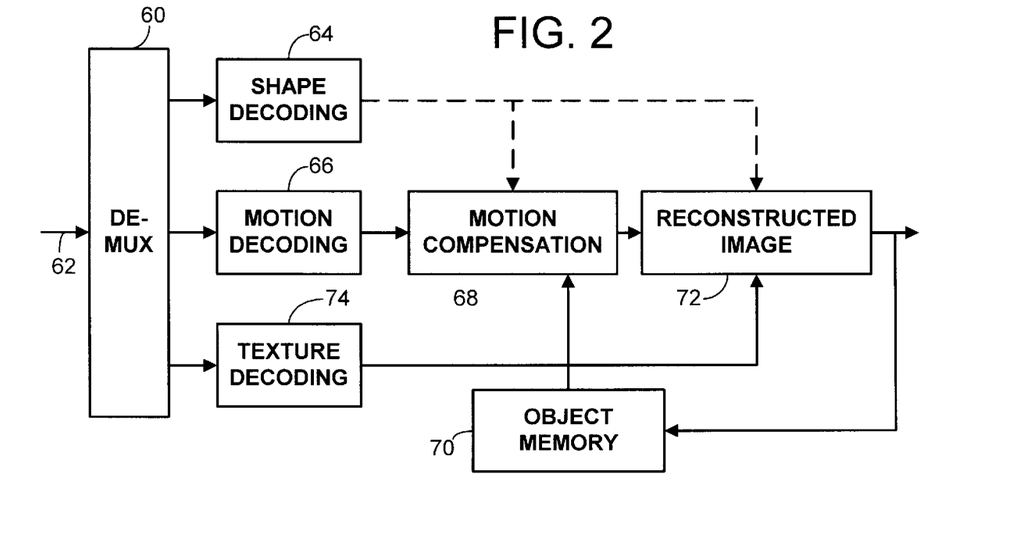
FIG. 2 is a block diagram of a video decoder.

FIG. 2 is a block diagram illustrating a decoder for an object-based video coding method. A demultiplexer 60 receives a bitstream representing a compressed video sequence and separates shapes, motion and texture encoded data on an object by object basis. Shape decoding module 64 decodes the shape or contour for the current object being processed. To accomplish this, it employs a shape decoder that implements the inverse of the shape encoding method used in the encoder of FIG. 2. The resulting shape data is a mask, such as a binary alpha plane or gray scale alpha plane representing the shape of the object.

The motion decoding module 66 decodes the motion information in the bitstream. The decoded motion information includes motion data such as motion vectors for macroblocks blocks or geometric transform coefficients, depending on the type of estimation method used in the encoder. The motion decoding module 66 provides this motion information to the motion compensation module 68, and the motion compensation module 68 applies the motion data to previously reconstructed object data 70.

The texture decoding module 74 decodes error signals for inter-frame coded texture data and an array of color values for intra-frame texture data and passes this information to a module 72 for computing and accumulating the reconstructed image. For inter-frame coded objects this module 72 applies the error signal data to the predicted image output from the motion compensation module to compute the reconstructed object for the current frame. For intra-frame coded objects the texture decoding module 74 decodes the image sample values for the object and places the reconstructed object in the reconstructed object module 72. Previously reconstructed objects are temporarily stored in object memory 70 and are used to construct the object for other frames.

Like the encoder, the decoder can be implemented in hardware, software or a combination of both. In software implementations, the modules in the decoder are software routines executing in memory of a computer and memory used to store the video data. A software decoder can be stored and distributed on a variety of conventional computer readable media. In hardware implementations, the decoder modules are implemented in digital logic, preferably in an integrated circuit. Some of the decoder functions can be optimized in special purpose digital logic devices in a computer peripheral to off-load the processing burden from a host computer.

Improved Coding of COD Parameter

In current and proposed video coding standards, the parameter COD is used to indicate whether motion and texture are encoded for a interframe macroblock. The use of the COD bit is optimized for very low bitrate coding of low motion scenes. For many applications, and in particular for Internet applications, this use of the COD bit may be inefficient. For example, in these applications:

The available bitrate for video is typically 10+kilobits per second (kbps);

the picture size is typically QCIF (QCIF is a standard frame size that has 99 macroblocks);

the frame rate is typically 5+per second; and the scene change is frequent and motion between frames is mostly non-zero.

Under these conditions, the majority of the texture data for the macroblocks/blocks have non-zero coefficients. The COD bit is not effective in these circumstances because coding is skipped for few macroblocks yet the COD parameter is sent for all of the interframe macroblocks whether they are skipped or not. The bitrate for the COD parameter is about 0.5 kbps. The method detailed below adaptively disables the COD bit and potentially saves 2–3% of the total bitrate.

To improve the efficiency of the COD parameter, the encoder adaptively disables this parameter for interframe coded images in which the number of non-coded macroblock exceeds a threshold value. In object based coding, the encoder adds a flag to the coding syntax at the video object plane level to indicate whether the COD parameter is disabled for all interframe macroblocks in the video object plane. The video object plane is an image representing an object in a frame.

In frame based coding, the encoder adds a flag to the coding syntax at the frame level to indicate whether the COD parameter is disabled for all macroblocks in the frame. Note that in both the object based and frame based approach, the COD parameter is disabled for interframe macroblocks.

The video encoder of FIG. 1 encodes a video image in two primary stages. The first stage performs motion estimation and compensation, and the second stage constructs the bitstream in the appropriate coding syntax. Thus, the number of macroblocks for which the motion vectors and texture data are all zero are determined in the first stage. Based on the number of these macroblocks, the second stage determines whether to disable the COD parameter for all of the macroblocks in the video image.

Figure 3:
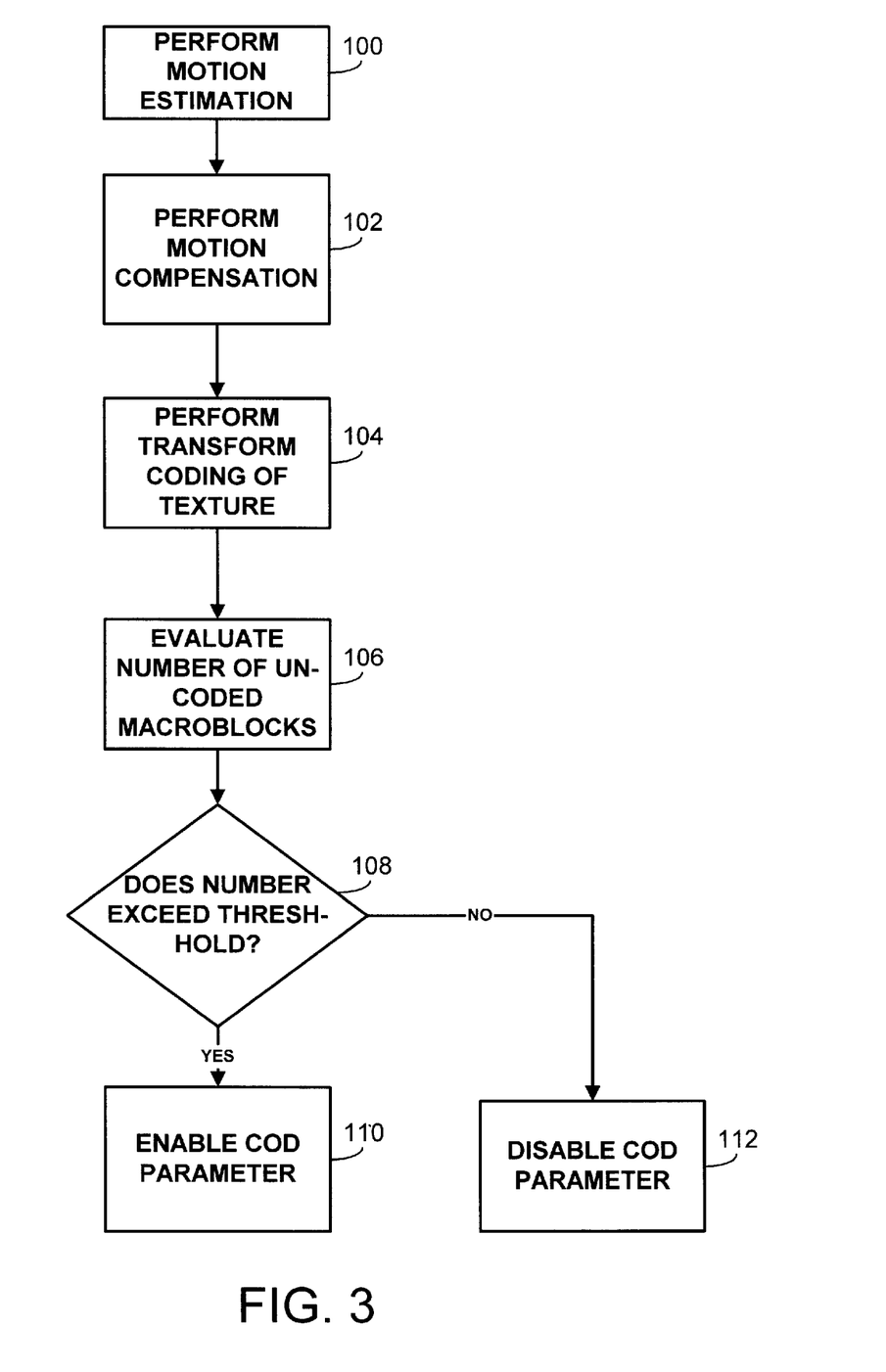
FIG. 3 is a flow diagram illustrating an encoder process for adaptively disabling the COD parameter for interframe macroblocks.

FIG. 3 is a flow diagram illustrating a process for adaptively disabling the COD parameter while encoding a video image. The encoder performs motion estimation and compensation (100, 102) and notes whether the motion vectors are zero. As it performs transform coding for each interframe macroblock and block (104), the encoder also notes whether the DCT transform coefficients for the macroblock are all zero. This can occur in cases where the error values for all of the image samples in a macroblock are zero or are approximately zero.

When motion and texture coding is complete for the image, the second stage of the encoder determines the number of blocks for which the motion vectors and transform coefficients are all zero (106). These blocks are sometimes referred to as skipped blocks because the encoding of motion vectors and transform coefficients is skipped for these macroblocks. If the number of skipped macroblocks exceeds a threshold value, then it is efficient to use the COD parameter for each macroblock, indicating whether the macroblock is coded. In this case, the COD parameter is enabled by clearing a COD disable flag for the image (110). Otherwise, the COD disable flag is set for the image.

The coding syntax for the image includes the COD disable flag to indicate whether the macroblock syntax includes the COD parameter. The COD parameter is set to one if the transform coefficients for an inter macroblock are all zero, and otherwise, it is set to zero.

The following table will help illustrate how the COD disable flag improves coding efficiency for an image. The syntax for an interframe macroblock is as follows.

| COD | MCBPC | CBPY | MVD | DCT block |

If the COD bit is set, then MCBPC, CBPY, MVD (motion vector data)), and DCT block are not sent for the block. This is referred to as a skipped macroblock. Conversely, when the COD bit is not set in conventional coding standards, the macroblock includes entropy coded bits for MCBPC and CBPY, a coded motion vector or coded motion vectors (MVD), and at least one DCT block. Motion vectors are typically coded as differential motion vectors. A differential motion vector is a vector quantity (e.g., has a vertical and horizontal component) representing the difference between two motion vectors, such as the difference between the motion vectors for the current and previous macroblock.

In scenes having few macroblocks with zero motion and frequent changes from frame to frame, there are likely to be very few skipped macroblocks. Under these circumstances, the COD bit is inefficient because it adds an extra bit to the macroblock. If the COD parameter is disabled, each of the coded macroblocks have one less bit relative to the case where COD is enabled. Assuming, for example, that Huffman coding is used to encode MCBPC and CBPY, each of the macroblocks with zero motion or texture data have extra bits for MCBPC (1 bit), CBPY (2 bits) and MVD (2 or more bits). The motion and texture for this type of macroblock requires at least 5 bits to code (MCBPC+CBPY+MV>5). Thus, by disabling the COD parameter, this macroblock requires at least 5 bits to code, instead of just one bit in the case where COD is enabled.

The threshold number of skipped macroblocks can be evaluated analytically based on the total number of macroblocks in the image and the bits required to code a macroblock with zero motion and texture data and no COD parameter. The following expression gives an example of a threshold value:

$$(1/x)\ MB_{total} > MB_{skipped}$$

where $MB_{skipped}$ is the number of skipped macroblocks, $MB_{total}$ is the total number of macroblocks in the image, and x is the number of bits needed to code a macroblock when the motion and texture data is all zero. The threshold number is: $(1/x)\ MB_{total}$.

It is important to emphasize that this threshold value is only an example. The number of bits needed to code a macroblock with zero motion and texture data can vary depending on the specific coding methods. For instance, in cases where Huffman coding is used, it is easier to estimate the number of bits needed to encode MCBPC and CBPY as illustrated in the above example. In cases where arithmetic coding is used, it is more difficult to compute the number of bits needed to encode a macroblock with zero motion and texture data. However, a similar approach as shown above can be used in the case of arithmetic coding by using a conservative estimate of the number of bits needed to encode the parameters in a macroblock with zero texture and motion data.

There are a variety of heuristic and analytical methods for selecting a threshold value. One way is to compute an average of the number of bits needed to encode macroblocks with zero motion and texture data for a frame and then use a formula similar to the one shown above (e.g., $(1/x_{average})$ $MB_{total}$) to compute a threshold value for the frame. Another way is to compare, on a frame by frame basis, the number of bits needed to code the frame with and without the COD parameter and then select the approach that uses fewer bits.

Figure 4:
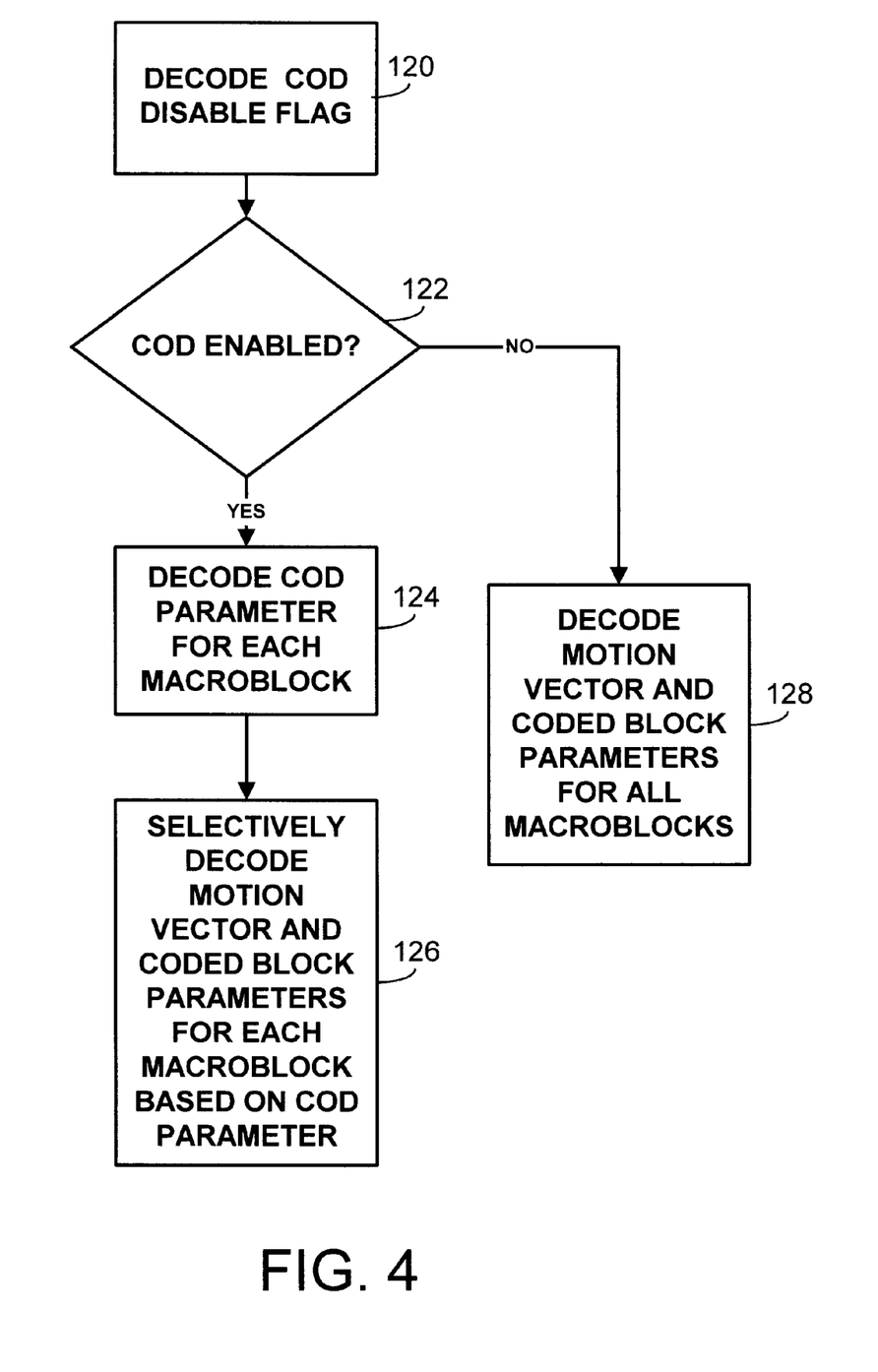
FIG. 4 is a flow diagram illustrating how a decoder interprets macroblocks for which the COD parameter is enabled and disabled.

The decoder has to be modified to support adaptive enabling and disabling of the COD parameter. FIG. 4 is a flow diagram illustrating how a decoder interprets macroblocks for which the COD parameter is enabled and disabled. In a frame based approach, the COD disable flag is coded at the frame level, namely, there is a single flag for each frame. In an object based approach, the COD disable flag is preferably coded at the video object plane level. In other words, each of the interframe coded objects has a COD disable flag for each frame. When the decoder decodes the frame or object level parameters, it decodes the COD disable flag (120) and determines whether the COD parameter is enabled or disabled (122).

If the COD parameter is enabled, the parameters at the macroblock level are interpreted as having a COD parameter for each macroblock in the image (124). In this case, the decoder selectively decodes motion vector and coded block parameters for each macroblock for which the COD parameter is set.

If the COD parameter is disabled, the parameters at the macroblock level are interpreted as not having a COD parameter for each macroblock (128). As such, the decoder decodes the motion vector and coded block parameter data for each macroblock.

Adaptive Coding of CBPY

Figure 5:
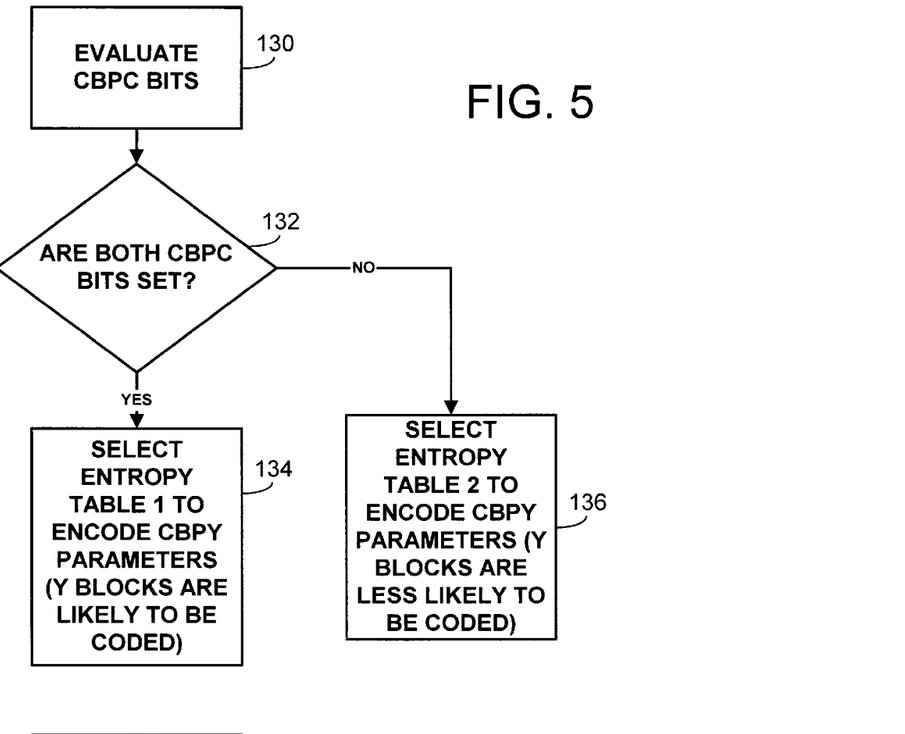
FIG. 5 is a flow diagram illustrating how an encoder process manages entropy coding of CBPY parameters based on the values of CBPC parameters.

The coding efficiency of scenes having few macroblocks with zero motion can be improved by adaptively selecting an entropy coding mode for the CBPY bits based on the CBPC bits. FIG. 5 is a flow diagram illustrating how an encoder process manages entropy coding of CBPY based on the values of CBPC.

The encoder evaluates the CBPC bits for each macroblock (130). There are two bits, one for each chrominance block. If both bits are set, meaning both chrominance blocks have non-zero transform coefficients, then it is likely that at least one of the four luminance blocks will have non-zero transform coefficients as well. The encoder adaptively selects an entropy code for CBPY based on the value of the CBPC parameters. If the CBPC bits are set, the encoder selects an entropy encoding mode that assigns a higher probability to coded luminance blocks (134). Conversely, if at least one of the CBPC bits is not set, the encoder selects an entropy encoding mode that assigns a higher probability to un-coded luminance blocks (136). This approach is implemented by adaptively selecting between two entropy coding tables for inter-frame macroblocks based on the CBPC bits.

The conventional approach in proposed standards such as H263 is to use a first entropy coding table (e.g., a Huffman table) to create an entropy code for all intra-frame macroblocks, and a second entropy coding table to create an entropy code for all inter-frame macroblocks. The following table shows an example of entropy coding tables that are used to compute a variable length code (VLC). Table 1 is the conventional VLC table for intra-type macroblocks, and table 2 is the conventional VLC table for inter-type macroblocks. The CBPY bits indicate a one (1) for a coded block, and zero (0) for an un-coded block. Note that un-coded blocks are deemed more likely for inter-macroblocks, and thus, are encoded with a code of shorter length than for coded blocks. Conversely, coded blocks are deemed more likely for intra-macroblocks, and thus, are encoded with a code of shorter length than for un-coded blocks.

| Index | Table 1: CBPY (12 34) | Table 2: CBPY (12 34) | Number of Bits | Codes |
|---|---|---|---|---|
| 0.00 | 00 | 11 | | |
| | 00 | 11 | 4 | 0011 |
| 1 | 00 | 11 | | |
| | 01 | 10 | 5 | 0010 1 |
| 2 | 00 | 11 | | |
| | 10 | 01 | 5 | 0010 0 |
| 3 | 00 | 11 | | |
| | 11 | 00 | 4 | 1001 |
| 4 | 01 | 10 | | |
| | 00 | 11 | 5 | 0001 1 |
| 5 | 01 | 10 | | |
| | 01 | 10 | 4 | 0111 |
| 6 | 01 | 10 | | |
| | 10 | 01 | 6 | 0000 10 |
| 7 | 01 | 10 | | |
| | 11 | 00 | 4 | 1011 |
| 8 | 10 | 01 | | |
| | 00 | 11 | 5 | 0001 0 |
| 9 | 10 | 01 | | |
| | 01 | 10 | 6 | 0000 11 |
| 10 | 10 | 01 | | |
| | 10 | 01 | 4 | 0101 |
| 11 | 10 | 01 | | |
| | 11 | 00 | 4 | 1010 |
| 12 | 11 | 00 | | |
| | 00 | 11 | 4 | 0100 |
| 13 | 11 | 00 | | |

-continued

| Index | Table 1: CBPY (1234) | Table 2: CBPY (1234) | Number of Bits | Codes |
|---|---|---|---|---|
|    | 01 | 10 | 4 | 1000 |
| 14 | 11 | 00 |   |      |
|    | 10 | 01 | 4 | 0110 |
| 15 | 11 | 00 |   |      |
|    | 11 | 00 | 2 | 11   |

An improved method of coding CBPY is to select table 1 for inter-frame macroblocks when the CBPC blocks are both coded, and to select table 2 for inter-frame macroblocks when at least one of the CBPC blocks is not coded. Experiments have shown that adaptive selection of tables 1 and 2 for inter-frame macroblocks reduces the number of bits needed to encode CBPY for standard test video sequences from about a few percent to more than 26%. In the test case Akiyo where there is little change from frame to frame, adaptive selection of the CBPY tables produced a slight increase in the number of bits for CBPY (less than 0.1%). The advantages of this improved coding of CBPY are more significant for lower quantization step sizes and more complex scenes.

It is important to note that the above description of adaptive coding of CBPY is only one possible implementation. Note that there are three possible states for CBPC bits in the context of adaptive coding of CBPY: (1) both set (CBPC=11); (2) both clear (CBPC=00); and (3) one bit set-one bit clear (CBPC=01 or 10). In the implementation above, one entropy coding mode is used for state (1) and a second entropy coding mode is used for states (2) and (3). In some applications, it is advantageous to group state (2) with the entropy coding mode for state (1). A variety of different combinations of entropy coding modes and CBPC states are possible, and more than two entropy coding modes could also be used. For example, three different coding modes could be used for the three different states of CBPC.

The adaptive coding of COD and CBPY can be used together. Since the adaptive coding of CBPY is based on CBPC bits that are already in the macroblock format, it is not necessary to add an additional flag indicating whether this feature is enabled. However, adaptive coding of CBPY can be turned on and off by using a CBPY adaptive coding flag. One way to implement this flag would be to combine it with the COD disable flag. In this case, adaptive coding of COD and CBPY could be enabled and disabled together.

Figure 6:
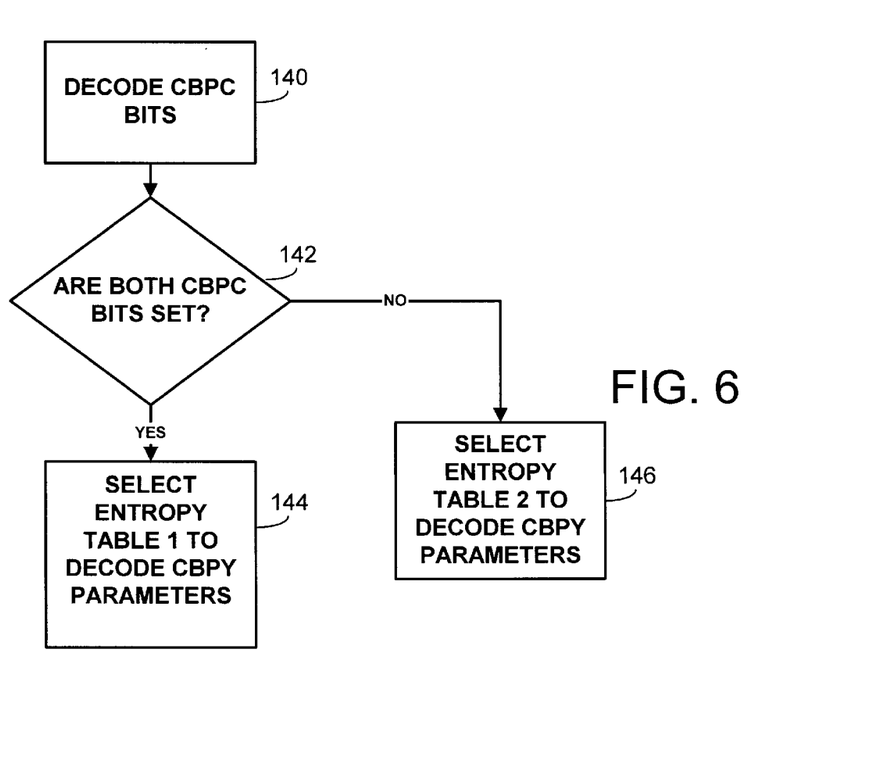
FIG. 6 is a flow diagram illustrating how a decoder interprets CBPY parameters of interframe macroblocks based on the values of the CBPC parameters.

Adaptive coding of CBPY can be implemented in the decoder by selecting the table used to decode CBPY based on the CBPC bits. FIG. 6 is a flow diagram illustrating how a decoder interprets CBPY parameters of interframe macroblocks based on the values of the CBPC parameters. In a typical decoding operation, the decoder decodes the CBPC bits for a macroblock (140). It then determines whether CBPC=11 (142). If so, the decoder decodes the VLC for CBPY using table 1. If not, the decoder decodes CBPY using table 2.

When implemented as described above, the improved coding of CBPY does not increase the complexity of the encoder or decoder and does not cause start code emulation concerns. "Start code emulation" refers to a compatibility problem caused by using a coding format that can be confused with a code used for synchronization called a "start code."

Conclusion

The coding methods described above improve coding efficiency for interframe blocks in two ways: 1) by adaptively disabling COD for scenes having few macroblocks with zero motion; and 2) by adaptively selecting entropy coding for CBPY using CBPC as indicator of motion and scene change. While the invention is described with reference to specific parameters, it is possible that the format and definition of these parameters can change depending on the implementation. The specific definitions used above are useful because they are consistent with current and proposed video coding standards. However, it is also possible to use the invention in video coding methods that use a different syntax.

In view of the many possible implementations of the invention, it should be recognized that the implementation described above is only examples of the invention and should not be taken as a limitation on the scope of the invention. Rather, the scope of the invention is defined by the following claims. We therefore claim as our invention all that comes within the scope and spirit of these claims.

We claim:

1. In a video coder for coding texture and motion data of video images in a block format, a method for improving compression of the video images comprising:

determining a value indicating how many blocks have motion and texture data values that are all substantially zero;

comparing the value to a threshold value;

when the value exceeds the threshold, using a parameter in the block format for blocks in a video image to indicate whether a corresponding block in the video image includes texture and motion data; and when the value does not exceed the threshold, encoding the block format for the blocks in the video image without using the parameter.

2. The method of claim 1 wherein the video images represent video objects in an video sequence that are encoded using shape, texture and motion data.

3. The method of claim 1 wherein the video images represent video frames in video sequence that are encoded using texture and motion data.

4. The method of claim 1 wherein the parameter is a COD bit, wherein the block format includes a COD bit for each block when the value exceeds the threshold, and the block format does not include a COD bit for any block in the video image when the value does not exceed the threshold.

5. The method of claim 4 further including:

wherein the video image is a video object in an object based coding method; and adaptively disabling or enabling the COD bit on an object by object basis in each frame.

6. The method of claim 4 further including:

wherein the video image is a video frame in a frame based coding method; and adaptively disabling or enabling the COD bit on a frame by frame basis such that the COD bit is either enabled for an entire frame or disabled for the entire frame.

7. The method of claim 1 further including:

encoding a disable bit with the video image to indicate whether the parameter is disabled.

8. A computer readable medium having instructions for performing the steps of claim 1.

9. In a video decoder, a method for decoding an interframe block comprising:

determining whether a coded macroblock parameter is enabled for a video image;

when the coded macroblock parameter is enabled, determining whether the coded macroblock parameter is set, and when the coded macroblock parameter is not set, skipping motion and texture decoding for a corresponding macroblock;

when the coded macroblock parameter is disabled, decoding motion and texture data for each macroblock in the video image.

10. The method of claim 9 wherein the video image is a frame in a video sequence and the coded macroblock parameter is enabled or disabled for each frame in the video sequence by coding a COD disable flag with each frame.

11. The method of claim 9 wherein the video image is a video object plane in a frame in a video sequence and the coded macroblock parameter is enabled or disabled for each video object plane in the video sequence by coding a COD disable flag with each video object plane.

12. A computer readable medium having instructions for performing the steps of claim 9.

13. In a video coder for coding texture and motion data of video images in a block format, a method for improving compression of the video images comprising:

evaluating coded block parameters for chrominance for an interframe macroblock;

adaptively selecting an entropy coding mode for the interframe macroblock including:
  analyzing the coded block parameters for chrominance to estimate whether luminance blocks are likely to be coded for the macroblock;
  employing a first entropy coding mode to encode the coded block parameters for luminance when the analysis of the coded block parameters for chrominance indicates that the luminance blocks are likely to be coded, wherein the first entropy coding mode uses fewer bits to indicate that the luminance blocks are coded than the number of bits used to indicate that the luminance blocks are not coded; and
  employing a second entropy coding mode to encode the coded block parameters for luminance when the analysis of the coded block parameters for chrominance indicates that the luminance blocks are not likely to be coded, wherein the second entropy coding mode uses more bits to indicate that the luminance blocks are coded than the number of bits used to indicate that the luminance blocks are not coded.

14. The method of claim 13 including:

while encoding inter-Macroblocks for a video image, evaluating the coded block parameters for chrominance, and employing a first entropy code table to encode the coded block parameters for luminance when the coded block parameters for chrominance are set, and employing a second entropy code table to encode the coded block parameters for luminance when at least one of the coded block parameters for chrominance is not set;

wherein the first entropy code table uses fewer bits to indicate that the luminance blocks are coded than the number of bits used to indicate that the luminance blocks are not coded; and wherein the second entropy code table uses more bits to indicate that the luminance blocks are coded than the number of bits used to indicate that the luminance blocks are not coded.

15. A computer readable medium having instructions for performing the steps of claim 13.

16. In a video decoder for decoding texture and motion data of video images in a block format, a method for decoding the video images comprising:

evaluating coded block parameters for chrominance for an interframe macroblock;

selecting an entropy decoding mode for the interframe macroblock including:
  when the coded block parameters for chrominance indicate that the chrominance is coded for the interframe macroblock, employing a first entropy decoding mode to decode the coded block parameters for luminance, wherein the first entropy decoding mode uses fewer bits to indicate that the luminance blocks are coded than the number of bits used to indicate that the luminance blocks are not coded; and
  when the coded block parameters for chrominance indicate that the chrominance is not coded for at least one chrominance block associated with the interframe macroblock, employing a second entropy decoding mode to encode the coded block parameters for luminance, wherein the second entropy decoding mode uses more bits to indicate that the luminance blocks are coded than the number of bits used to indicate that the luminance blocks are not coded.

17. The method of claim 16 wherein the first entropy decoding mode employs a first entropy coding table to decode the coded block parameters for luminance for the interframe macroblock, and the second entropy decoding mode employs a second entropy coding table to decode the coded block parameters for luminance for the interframe macroblock.

18. The method of claim 17 wherein the first and second tables are employed adaptively for each interframe macroblock based on the coded block parameters for chrominance in each interframe macroblock, such that the table used to decode each interframe macroblock can differ based on characteristics of each macroblock.

19. A computer readable medium having instructions for performing the steps of claim 16.

20. A computer readable medium having a data structure storing compressed interframe macroblocks; the computer readable medium comprising:

coded interframe images including coded interframe macroblocks corresponding to each of the interframe images;

each interframe image include a COD disable flag indicating whether the interframe macroblocks for the interframe image each have a COD parameter; wherein during decoding of the interframe images, the COD disable flag is operable to enable and disable decoding of the COD parameter such that when the COD parameter is enabled, texture and motion decoding for interframe macroblocks with the COD parameter set is skipped, and when the COD parameter is disabled, texture and motion decoding is performed for all interframe macroblocks in the interframe image.

* * * * *

UNITED STATES PATENT AND TRADEMARK OFFICE
CERTIFICATE OF CORRECTION

PATENT NO. : 5,946,043
DATED : August 31, 1999
INVENTOR(S) : Lee et al.

It is certified that error appears in the above-identified patent and that said Letters Patent is hereby corrected as shown below:

Title page,
References cited, please add:
U.S. PATENT DOCUMENTS
5,552,832    9/1996    Brian Astle
FOREIGN PATENT DOCUMENTS
EPO   771 114 A2   5/2/97   European Patent Appl.
EPO   786 907 A2   7/30/97  European Patent Appl.
EPO   707 425 A2   4/17/96  European Patent Appl.
EPO   588 653 A2   3/23/94  European Patent Appl.
OTHER DOCUMENTS
PCT/US98/20573 - International Search Report, 3/2/99

Webb, J.L.H., "Postprocessing to Reduce Blocking Artifacts for Low BitRate Video Coding Using Chrominance Information," 9/16/96, *Proceedings of the International Conference on Image Processing, (IC, Lausanne,* Sept. 16-19, 1996), Vol. 2, pp. 9-12, Institute of Electrical and Electronics Engineers, XP000733222

Ad Hoc Group on MPEG-4 Video VM Editing: "MPEG-4 Video Verification Model Version 7.0 - ISO/IEC JTC1/SC29/WG11 MPEG97/N1642 - Appendix A: Combined Motion Shape Texture Coding, Video Group (Draft in Progress), International Standards Organization, Coding of Moving Pictures and Associated Audio Information, XP002090865, April 1997, pp. 195-203"

Column 4,
Line 18, "macroblocks)." should read -- macroblocks"). --

Column 6,
Line 67, "macroblocks blocks or", should read -- macroblocks/blocks or --

Column 7,
Line 1, "macroblocks blocks or", should read -- macroblocks/blocks or --

UNITED STATES PATENT AND TRADEMARK OFFICE
CERTIFICATE OF CORRECTION

PATENT NO. : 5,946,043
DATED : August 31, 1999
INVENTOR(S) : Lee et al.

It is certified that error appears in the above-identified patent and that said Letters Patent is hereby corrected as shown below:

Column 8,
Line 50, "data))," should read -- data), --

Column 9,
Line 30, "However.," should read -- However, --

Column 12,
Line 35, "an" should read -- a --

Signed and Sealed this

Sixth Day of November, 2001

*Attest:*

*Attesting Officer*

NICHOLAS P. GODICI
*Acting Director of the United States Patent and Trademark Office*